United States Patent [19]
Tsuji et al.

[11] Patent Number: 5,998,969
[45] Date of Patent: Dec. 7, 1999

[54] APPARATUS FOR REGULATING STATE OF CHARGE OF CELLS OF BATTERY SET

[75] Inventors: Tadashi Tsuji; Masato Origuchi, both of Kanagawa-ken, Japan

[73] Assignee: Nissan Motor Co., Ltd., Kanagawa-ken, Japan

[21] Appl. No.: 09/076,106

[22] Filed: May 12, 1998

[30] Foreign Application Priority Data

May 12, 1997 [JP] Japan .................................. P9-121159

[51] Int. Cl.$^6$ ............................................... H02J 7/00
[52] U.S. Cl. ............................................ 320/132; 320/130
[58] Field of Search ................................... 320/132, 149, 320/116, 118, 119, 130

[56] References Cited

U.S. PATENT DOCUMENTS

| | | | |
|---|---|---|---|
| 5,498,950 | 3/1996 | Ouwerkerk | 320/119 |
| 5,578,914 | 11/1996 | Morita | 320/122 |
| 5,818,201 | 10/1998 | Stockstad et al. | 320/119 |
| 5,880,575 | 3/1997 | Yee et al. | 320/116 |

FOREIGN PATENT DOCUMENTS 7-336905  12/1995  Japan .

*Primary Examiner*—Peter S. Wong
*Assistant Examiner*—Lawrence Luk
*Attorney, Agent, or Firm*—McDermott, Will & Emery

[57] ABSTRACT

There is disclosed an apparatus for precisely regulating, with a simple structure, a state of charge of each of cells constituting a battery set. In the apparatus, a detection circuit, a plurality of discharge circuit connected to corresponding one of the cells, respectively, and a control circuit are provided. The detection circuit detects open-circuit voltage of each of the plurality of cells, the plurality of discharge circuit discharges a charging electricity charged in the cells, and the control circuit controls to uniform the state of charge of each of the cells, utilizing the discharge circuit respectively corresponding to each of the cells, based on the open-circuit voltage of each of the cells detected by the detection circuit.

7 Claims, 7 Drawing Sheets

APPARATUS FOR REGULATING STATE OF CHARGE OF CELLS OF BATTERY SET

BACKGROUND OF THE INVENTION

1. Field of the Invention

The present invention relates to an apparatus for regulating a state of charge of cells of a battery set, which is preferably used for regulating a state of charge of each cell of a battery set for an electric automotive vehicle, for example.

2. Description of the Related Art

Conventionally, an apparatus has been proposed for regulating to uniform each of the states of charge of a plurality of secondary cells serially connected in a battery set. The state of charge of the secondary cell is shown as SOC and the secondary cell is shown as cell, hereinafter.

For example, in an apparatus disclosed in Japanese Patent Application Unexamined Laid-open publication No. 7-336905, a constant-voltage circuit having a constant voltage control section and a current saturation detecting section is provided so as to be connected in parallel with each of the cells constituting a battery set. Here, electric current is charged from a charger to the cells while bypassing a portion of the current in accordance with a difference between a voltage of each of the cells and a set voltage, the voltage of each of the cells is controlled using the constant-voltage circuit such that the voltage becomes equal to the set voltage, and the SOC of each of the cells are uniformly regulated.

More specifically, the flow of charging current to each of the cells is suppressed by bypassing in order of SOC having a higher value, and, to unsuppressed cells, all of the charging current is charged, because the charging current is not bypassed.

When the current saturation detecting section detects that the bypassed cell whose charging current is suppressed is saturated, a current reducing signal is sent to the charger in order to reduce the charging current.

Then, the charging current is reduced stepwisely by repeating the above operation, and when a predetermined minimum charging current is achieved, the charging of the cell is completed.

However, in such an apparatus, the constant-voltage circuit is operated to regulate the SOC in each of the cells just before the charging is completed, and in the case that the charging is not conducted until the predetermined minimum charging current is achieved before the charging is completed, the SOC of each of the cells can not be regulated sufficiently.

Further, in this apparatus, the charging current is suppressed by flowing great bypass current of about maximum 1(A) in a short time about 30 minutes. Therefore, a heating value of the constant-voltage circuit is great and it is necessary to provide a radiator of large volume.

Further, in this apparatus, to put it in an extreme way, the SOC is regulated by flowing the same charging current to each of the cells or by stopping the flow of the charging current, and for example, since a magnitude of electric amount (Ah) to be charged can not independently be varied for a cell except the electrically bypassed cell, it is difficult to precisely regulate the SOC for each of the cells with respect to a target SOC, and regulating precision is not excellent.

SUMMARY OF THE INVENTION

It is an object of the present invention to provided an apparatus for precisely regulating, with a simple structure, a state of charge of each of cells constituting a battery set by serially connecting a plurality of the cells, that is, for regulating the SOC.

To achieve the object, in an apparatus for regulating the SOC of the present invention, a detection circuit for detecting open-circuit voltage of each of the plurality of cells, a plurality of discharge circuits respectively connected to the cells for discharging a charging electricity for each of the plurality of cells, and a control circuit for controlling to uniform the SOC, utilizing the discharge circuit respectively corresponding to the cells, based on the open-circuit voltage of each of the cells detected by the detection circuit.

With this structure, the discharge amount can be regulated in accordance with the open-circuit voltage for every cell using the discharge circuit disposed for every cell.

Therefore, the SOC can be regulated finely and precisely with a simple structure.

Further, since there is substantially no limitation for time to flow the discharge current, the discharge current can be flowed for a relatively long time, and the discharge amount of the charge electricity by the discharge circuit can be sufficiently small value. That is, it is possible to suppress the heat generated by the discharge circuit, and to make the radiator smaller, even if it is required.

Further, the control circuit may control to uniform the SOC when the battery set is discharged, when the battery set is charged, and/or when the battery set is in a cessation state.

That is, according to the present invention, since the discharge amount is regulated in accordance with the open-circuit voltage for every cell using the discharge circuit disposed for every cell, a flexibility of timing for regulating the SOC is high.

Further, in order to enhance the preciseness for regulating the SOC, it is preferable that the control circuit obtains a frequency distribution, that is, histogram, of the open-circuit voltage of each cell detected by the detection circuit, and quantifies the frequency distribution to conduct a statistical processing, thereby calculating the discharge capacity for uniforming the SOC.

In order to further enhance the preciseness for regulating the SOC, it is more preferable that the control circuit regards the frequency distribution as a normal distribution, and sets a regulation target voltage based on an average value of the open-circuit voltages of the cells detected by the detection circuit, and based on a standard deviation of the open-circuit voltages, and discharges the cells using the discharge circuit such that a terminal voltage of each of the cells becomes equal to the regulation target voltage.

More specifically, the discharge circuit is a serial circuit comprising a resistor and a switch, the control circuit intermittently close the switch of the discharge circuit to discharge of each of the cells. This structure is very simple.

Further, it is also preferable that the control circuit comprises a first calculation circuit for obtaining a predetermined statistical value by quantifying the frequency distribution to conduct a statistical processing, and a second calculation circuit for calculating a necessary amount of discharge for each of the cells based on the predetermined statistical value obtained by the first calculation circuit. Here, the detection circuit, the discharge circuit and the second calculation circuit are integrally formed with the battery set, and the first calculation circuit is disposed outside the battery set and is substantially insulated from the detection circuit, the discharge circuit and the second calculation circuit.

This is because a power system of the battery set and a signal system of the battery set can be separated and thus, the power system should not exert an undesirable influence on the signal system. Here, the word "insulation" means a physical insulation such as electricity, heat and the like which may influence from the power system to the signal system.

Further, it is preferable that a threshold value for judging an abnormality is set based on the open-circuit voltage of each of the cells detected by the detection circuit, and any of the cells having open-circuit voltage exceeding the threshold value is deleted from an object of capacity regulation.

This is because the number of cells requiring the regulation can be reduced and thus, the regulating operation can be simplified and energy loss due to the discharge can also be reduced.

DETAILED DESCRIPTION OF THE PREFERRED EMBODIMENT

An embodiment of the present invention will be described in detail with reference to the accompanying drawings below.

Figure 1:
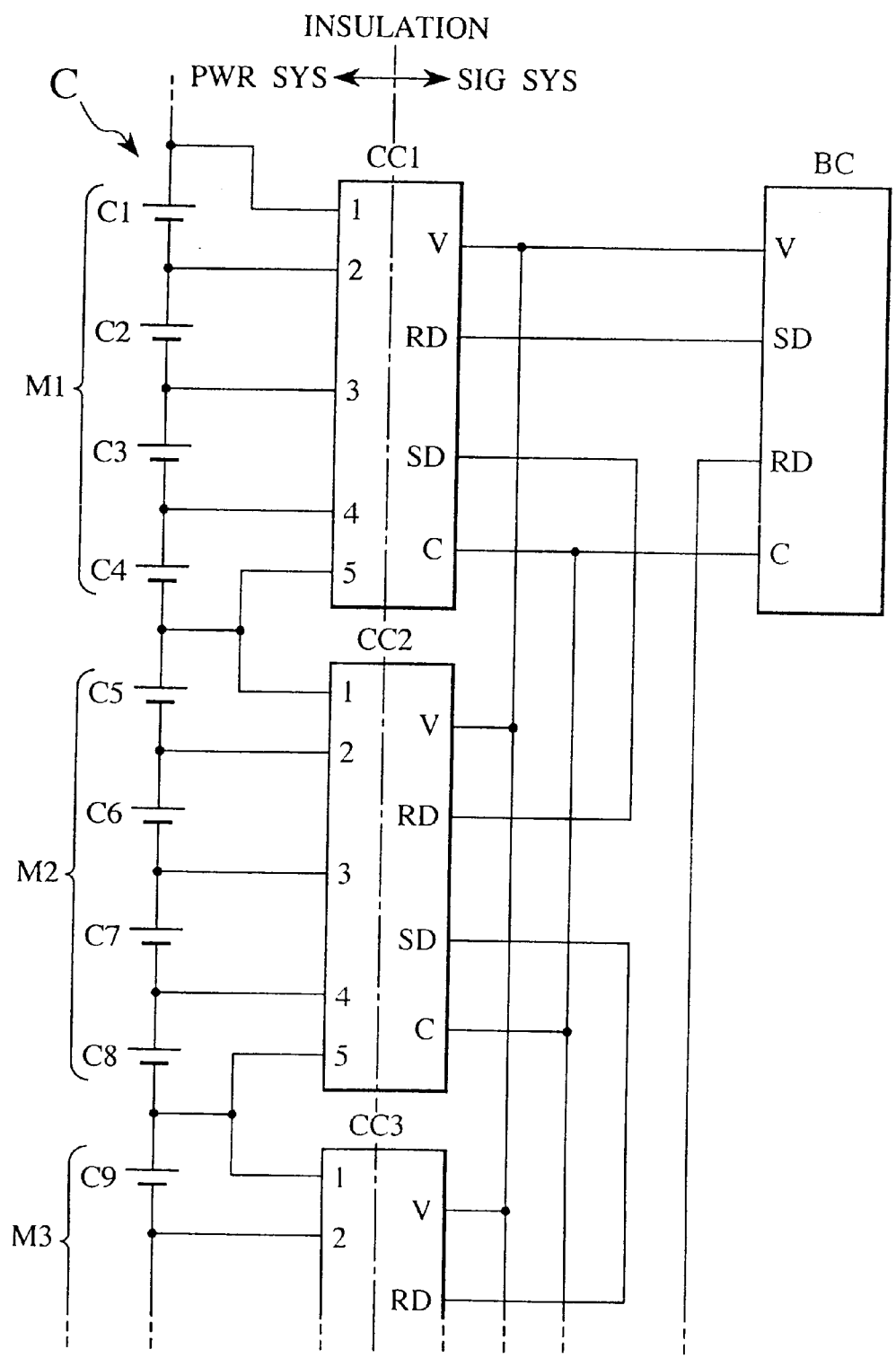
FIG. 1 is a block diagram of an apparatus for regulating a state of charge of cells of a battery set according to an embodiment of the present invention.

FIG. 1 is a block diagram of an apparatus according to an embodiment of the present invention.

A battery set C comprises n-number of cells C1, C2, ..., Cn which are serially connected. The cells C1 to Cn are grouped four by four to form modules M1, M2, .... Cell controllers CC1, CC2, ... manage cells using a module as a unit. More specifically, a cell controller CC1 controls the charge and discharge of the four cells C1 to C4 included in the module M1. A battery controller BC controls cell controllers CC, and manages the battery set C. The battery controller BC supplies electric power to each of the cell controllers CC through terminals V and C, and communicates with each of the cell controllers CC by serial communication through sending terminals SD and receiving terminals RD. As shown in FIG. 1, a power system and a signal system are insulated to each other.

Figure 2:
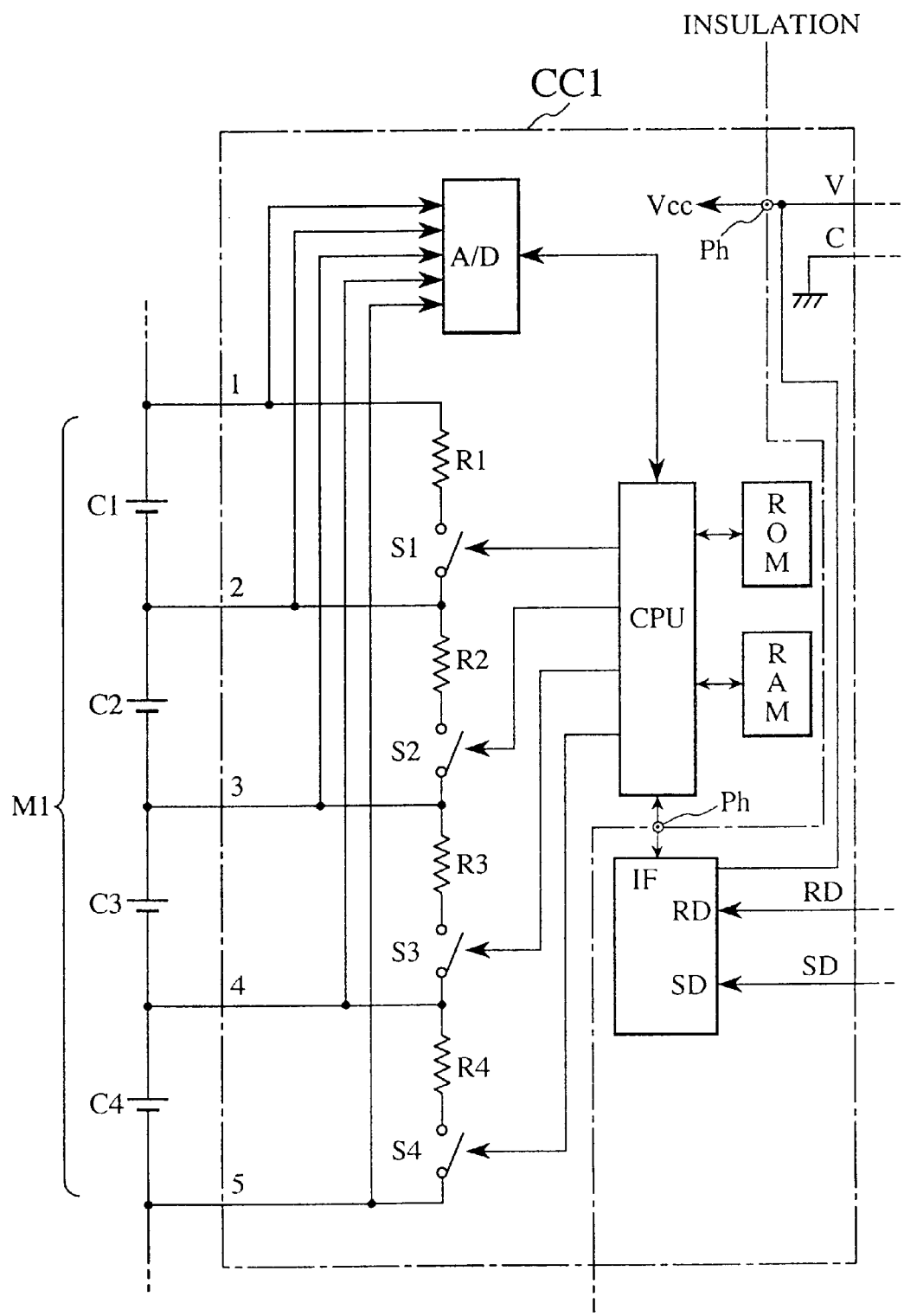
FIG. 2 is a circuit diagram of a cell controller of the apparatus.

FIG. 2 is a detailed circuit diagram of the cell controller CC of the embodiment. Although the explanation will be made based on the cell controller CC1 here, the same can be applied to other cell controllers.

The cell controller CC1 is integrally formed with the module M1 of the battery set. The cell controller CC1 includes a CPU, a ROM, a RAM, an A/D converter, an IF, resistors R1 to R4, and switches S1 to S4. The A/D converter converts terminal voltage of each of the cells into digital signal and sends it to the CPU. The interface IF communicates with the battery controller BC by serial communication. The interface IF and the power source Vcc are in communication with each other through a photo-coupler Ph, and are substantially insulated from each other. Further, high voltage about 400(V) at the maximum is applied to an internal circuit in the battery set C. A wiring of a detection circuit detecting voltage to the A/D converter, and a capacity regulating circuit comprising the resistors R1, R2 ... and the switches S1, S2, ... are incorporated in the cell controller CC to avoid a contact with the high voltage circuit.

A serial circuit comprising the resister R and the switch S is connected to each of the cells C1, C2, ... in parallel. The serial circuit comprising the resister R and the switch S is the capacity regulating circuit capable of regulating a charging capacity of each of the cells by discharging a charging electric charge of the cell through the resister R. The switches S1, S2, ... are controlled for opening and closing by the CPU. For example, if the switch S1 is closed, the cell C1 discharges through the resistor R1. The same can be applied to the other cells. Resistance values of the resistors R1, R2, ... are the same, and the capacity to be regulated is controlled by intermittently closing the switch S in proportion to closing time of the switch S. In the case of Li-ion battery, the capacity to be regulated is about 0.1% or less of rated capacity of the battery set C, and it is possible to sufficiently suppress variation of the charging amounts of the cells.

A method for detecting open-circuit voltage Vc of each of the cell will be explained.

Each of open-circuit voltage Vc of each of the cells C1, C2, ... is detected by the A/D converter of the corresponding cell controller CC, and is converted into digital signal and then is sent to the CPU of the cell controller CC, and further is sent to the battery controller BC through the interface IF.

The timing of detection of the cell open-circuit voltage Vc may be (1) just before the discharge of the battery set is started, (2) just before the charge of the battery set is completed (in current attenuation range), and (3) during the charge of the battery set.

(1) Just before the discharge of the battery set is started, a timing for detecting the open-circuit voltage is not limited so much. However, since discharge from the battery set C to a load must be stopped while the detection result is sent from each cell controller CC to the battery controller BC, a high speed A/D conversion and a high communication speed are required.

(2) In the current attenuation range just before the charge is completed, since the charging current is small, voltage drop due to internal resistance of the cell is small, and a voltage close to the open-circuit voltage can be detected. Further, since this timing is when the charge is conducted, it is unnecessary to conduct the high speed A/D conversion and communication. However, this timing is limited from a time point just before the charge is completed to a time point when the charge is completed.

(3) During the charge, the discharge voltage V and discharge current I of every cell are measured, and voltage-current characteristic (V=E−IR) for every cell is obtained by liner regression so as to estimate the open-circuit voltage E for every cell. However, since it is calculated for every cell, a load of CPU and the like is increased.

When the discharge of the cell is conducted using the resistor R by closing the switch S while the open-circuit voltage Vc is being detected, the measuring error of the open-circuit voltage Vc becomes larger. So, it is necessary to prohibit the switch S from closing.

Each of the cell controllers CC1, CC2, . . . stores the open-circuit voltage Vc into the RAM, and sends it to the battery controller BC through the interface IF. The battery controller BC calculates an average value Va and a standard deviation σ based on the open-circuit voltage Vc1 to Vcn collected from the cell controllers CC1, CC2, . . . , and sends then to the cell controllers CC1, CC2, . . . . Each of the cell controllers CC1, CC2, . . . relatively grasps the positioning of the open-circuit voltage of the cell within a territory based on the open-circuit voltage average value Va and the standard deviation σ, and judges whether the capacity to be regulated is required for the cell. More specifically, each of the cell controllers CC1, CC2, . . . determines the regulating electricity amount for the cell by setting a temporary regulating target voltage Vv.

Figure 3:
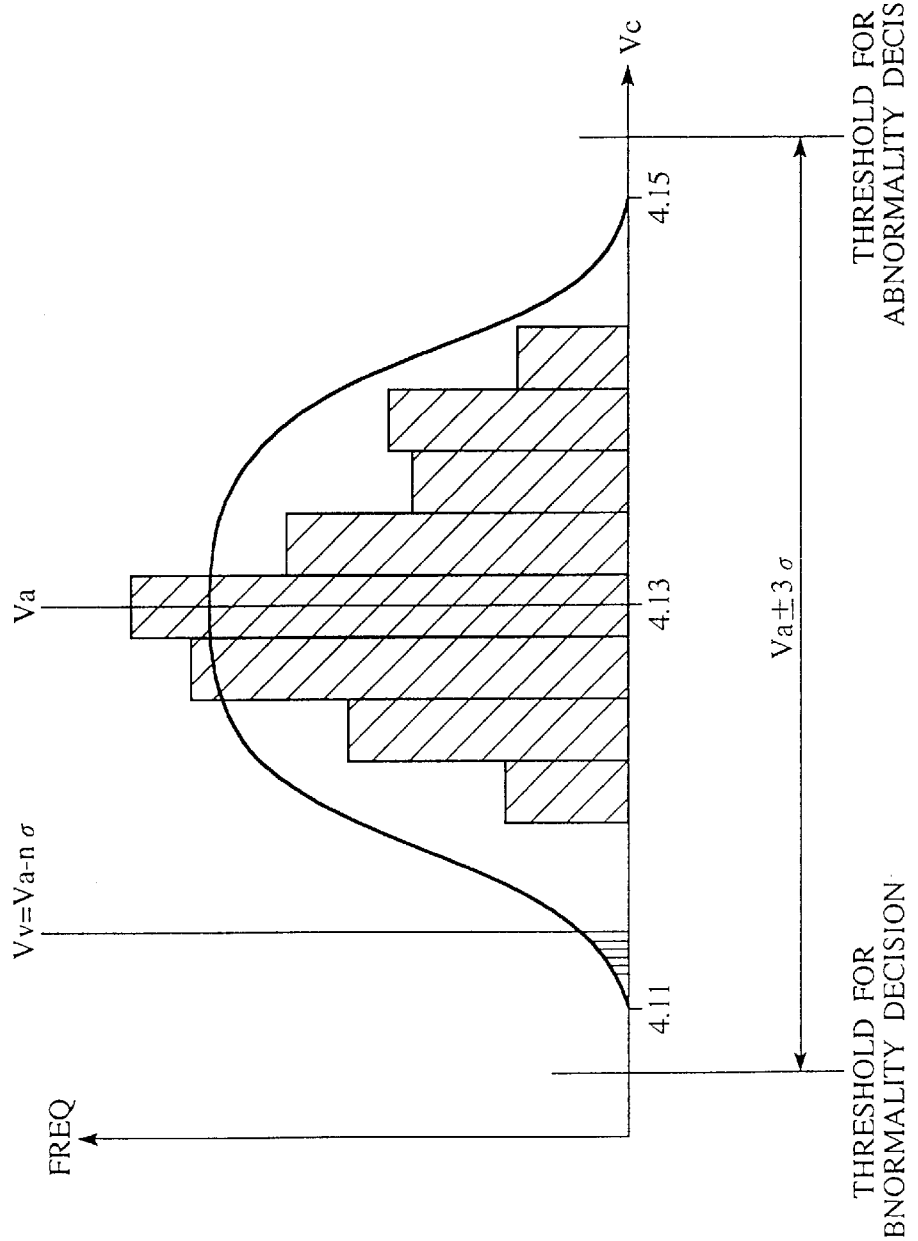
FIG. 3 is a graph showing frequency distribution of discharging voltage of each of cells provided by the apparatus.

FIG. 3 shows a distribution of the open-circuit voltage Vc.

In this embodiment, a cell having open-circuit voltage exceeding ±3σ from the open-circuit voltage average value Va is judged as an abnormal cell, with a distribution of the cell open-circuit voltage Vc as a normal distribution. For example, if the temporary target voltage Vv is taken as a minimum value of the cell open-circuit voltage Vc, when there is an abnormal cell, it is necessary to extremely regulate the capacity of most of the cells, and energy loss becomes great. Thereupon, in this embodiment, a parameter n of σ is taken as 3, and a cell having the open-circuit voltage exceeding abnormality judging threshold value (Va±3σ) is taken as the abnormal cell, and the abnormal cell was deleted from an object of capacity regulation. In FIG. 3, the upper limit value 4.15(V) of the cell open-circuit voltage Vc is in a range of the abnormality judging threshold value (Va±3σ).

In this manner, the abnormality judging threshold value is set by statistical calculation based on the open-circuit voltage of each of the cells, and the cell having the open-circuit voltage exceeding abnormality judging threshold value is deleted from the object of capacity regulation. Since the open-circuit voltage of the abnormal cell exceeding the abnormality judging threshold value is taken into a consideration in this manner, it is possible to suppress the cell open-circuit capacity from being increased, and to minimize the energy loss when the SOC is regulated by discharge.

In the present embodiment, the temporary regulating target voltage Vv is provided using the following equation;

$$Vv = Va - n \cdot \sigma$$

In this equation, the parameter n is set such that the temporary regulating target voltage Vv falls in a range of the abnormality judging threshold valve (Va±3σ).

A deviation Vcd between the open-circuit voltage Vc of each of the cells and the temporary regulating target voltage Vv is provided using the following equation;

$$Vcd = Vc - Vv$$

Figure 4:
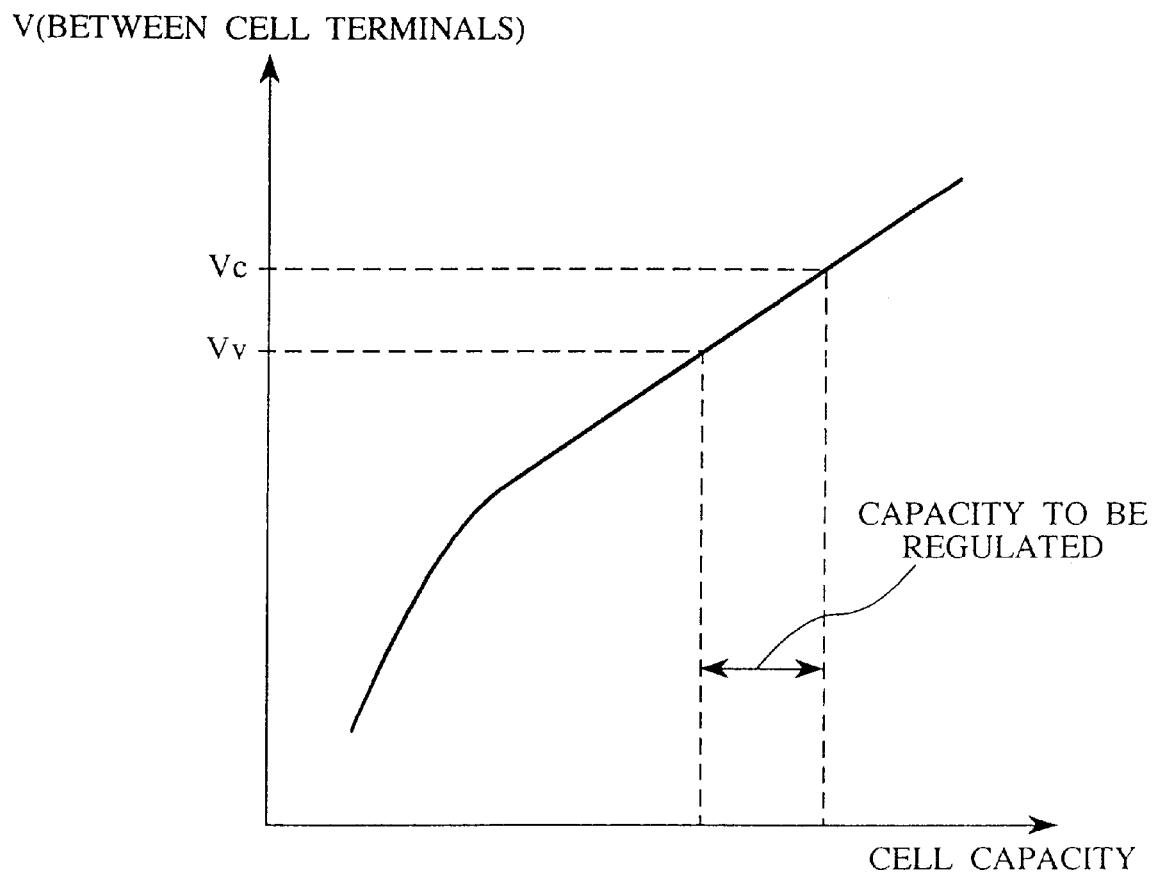
FIG. 4 is a graph showing a relationship between cell capacity and cell terminal voltage explained in the embodiment of the present invention.

The maximum capacity to be regulated Ctmax (Ah) corresponding to the open-circuit voltage deviation Vcd is provided by interpolating calculation from a conversion table (not shown) of the maximum capacity to be regulated Ctmax corresponding to the open-circuit voltage deviation Vcd. However, although the cell capacity of the battery set and the terminal voltage are linearly correlative with each other in a wide range of the SOC as shown in FIG. 4, in a discharge completion region (left region in FIG. 4) in which the SOC is low, sensitivity of the capacity with respect to the voltage is high. That is, the calculation error becomes greater. Therefore, when the maximum regulating capacity Ctmax is to be obtained from the open-circuit voltage deviation Vcd, a calculation based on the open-circuit voltage Vc is not conducted if the SOC is extremely low.

Further, the actual regulating capacity Ct is provided using the following equation taking an regulating gain as γ:

$$Ct = Ctmax \cdot \gamma$$

When Ct is equal to or less than a specified value, Ct may be equal to 0.

Next, a regulating current Ib is obtained in accordance with the required regulating capacity Ct for every cell using the interpolating calculation from a conversion table (not shown) of regulating current Ib with respect to the capacity to be regulated Ct. Then, intermittent closing condition of the switch S of the capacity regulating circuit is determined by a predetermined regulating completion time and the regulating current Ib, and the switch S is controlled to be opened and closed under the intermittent closing condition.

The regulating operation of the SOC can be conducted not only during the discharging and charging the battery set C, but also during cessation.

Figure 5:
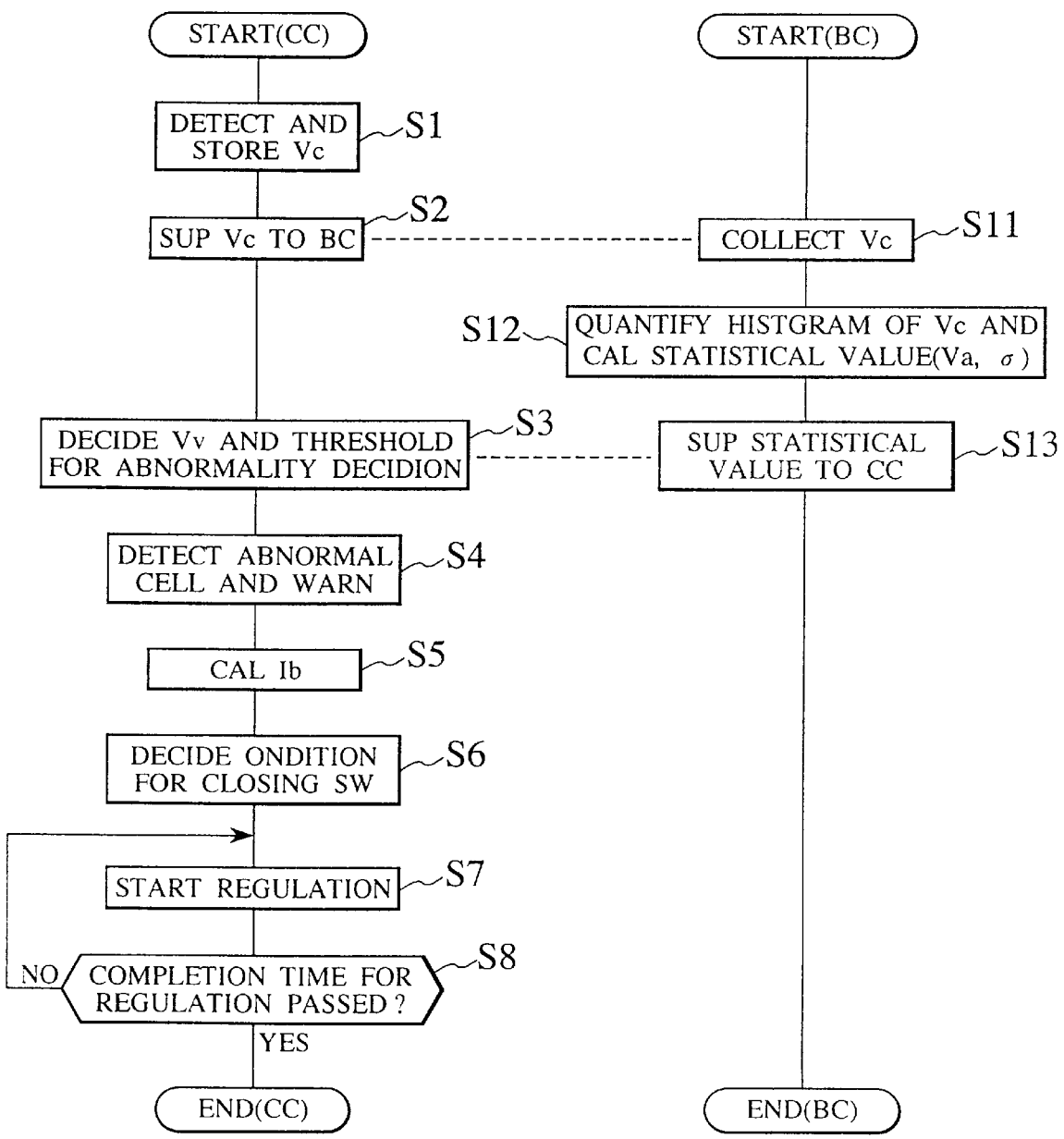
FIG. 5 is a flowchart showing the operation of the cell controller and a battery controller of the apparatus for regulating a state of charge of cells of a battery set according to an embodiment of the present invention.

FIG. 5 is a flowchart showing an regulating operation of the SOC by using the cell controller CC and the battery controller BC. The regulating operation of the SOC of the embodiment will be described in detailed with reference to this flowchart.

First, when this regulating apparatus is turned on, the cell controller CC and the battery controller BC start procedures shown in FIG. 5. In step 1, the cell controller CC detects the open-circuit voltage Vc of each of the cells by the A/D converter, and stores the result in the RAM (S1). In next step 2, the open-circuit voltage Vc of the cell is supplied to the battery controller BC (S2).

The battery controller BC collects the cell open-circuit voltage Vc of the cell from the cell controller CC in step 11 (S11). In next step 12, the distribution of the cell open-circuit voltage Vc is quantified to calculate the average value Va and the standard deviation σ (S12). Then, in step 13, statistical values such as the open-circuit voltage average value Va, the standard deviation σ and the parameter n are sent to each of the cell controllers CC (S13).

The cell controller CC receives the statistical values from the battery controller BC in step 3, and determines a temporary regulating target voltage Vv and an abnormality judging threshold valve (Va±3σ) (S3). In next step 4, an abnormal cell having the cell open-circuit voltage Vc exceeding the abnormality judging threshold value (Va±3σ) is detected, and its warning is given (S4). In step 5, the regulating current Ib is calculated (S5). In step 6, a desired capacity regulation completion time is set, and an intermittent closing condition of the switch S is determined in accordance with the regulation completion time and the regulating current Ib (S6). In step 7, the switch S is controlled for opening and closing under the determined intermittent closing condition to start regulation of the capacity (S7). In step 8, the regulation of capacity is conducted until the regulation completion time is elapsed (S8).

Whenever the above described series of regulating operations of the capacity, the SOC, that is, the state of charge of each of the cells which constitute the battery set are converged to a constant value.

In the case of the conventional regulation of the SOC, the bypass current of the maximum 1(A) is flowed and the capacity, that is, 1(A)×0.5(h)=0.5(Ah) is regulated. Whereas, in the case of the present embodiment, when the same capacity is regulated, it is possible to regulate the SOC by flowing smaller regulating current of, e.g., about 0.1(A) for five hours, which means that amount of heat generated by the resister R is reduced to ¹⁄₁₀. Therefore, a radiator of the resister R of the present embodiment can be smaller in capacity comparing with a radiator of a conventional charging current bypass circuit.

Figure 6A:
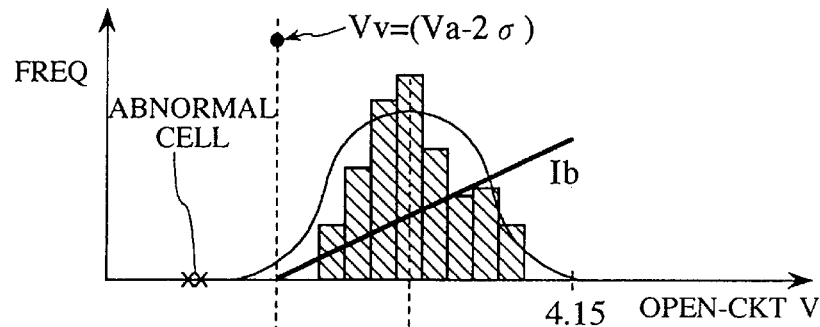
FIGS. 6A to 6C are graphs for explaining examples for regulating capacity of each of the cells by the apparatus.
Figure 6B:
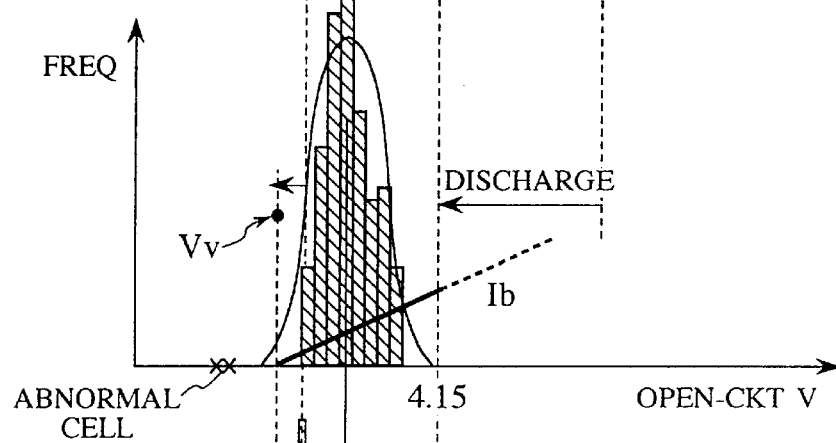
Figure 6C:
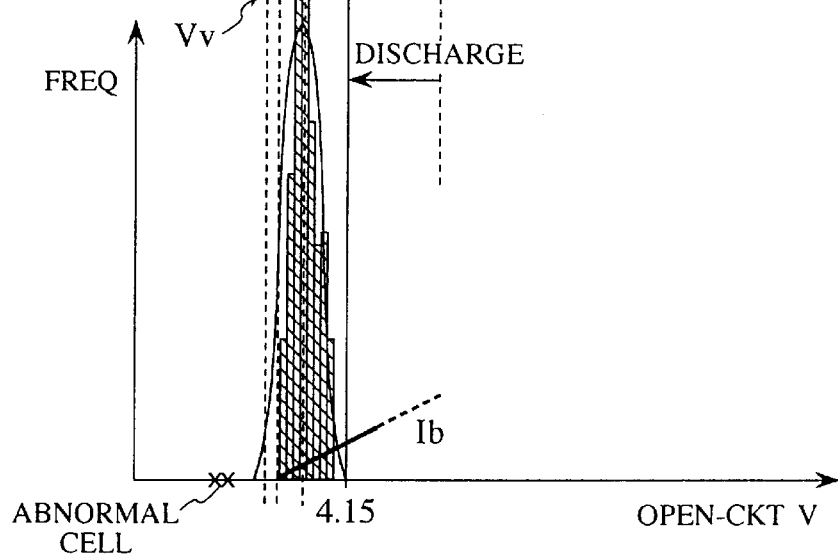

FIGS. 6A to 6C show results of capacity regulation according to the present embodiment. FIG. 6A shows a variation in cell open-circuit voltage Vc before the capacity is regulated, FIG. 6B shows a variation in cell open-circuit voltage Vc when a first regulation of the capacity is conducted, and FIG. 6C shows a variation in cell open-circuit voltage Vc when a second regulation of the capacity is conducted. The capacity regulation is conducted while taking the temporary regulation target voltage Vv as (Va−2σ), and the regulation gain γ as 50 (%).

With this capacity regulation, the regulation is advanced such that the variation is reduced while keeping the initial voltage distribution states of cells, and the distribution of the open-circuit voltage is natural.

Figure 7A:
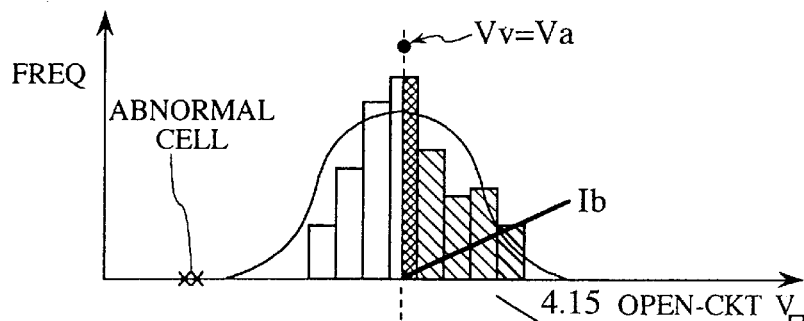
FIGS. 7A to 7C are graphs for explaining other examples for regulating capacity of each of the cells by the apparatus.
Figure 7B:
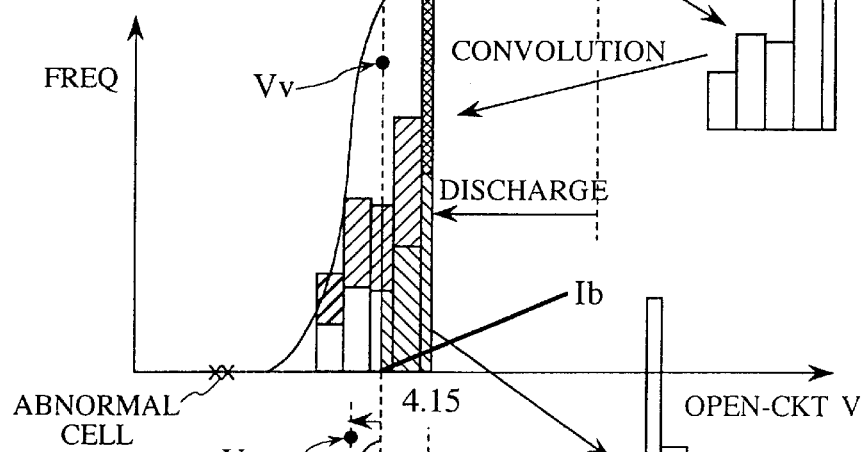
Figure 7C:
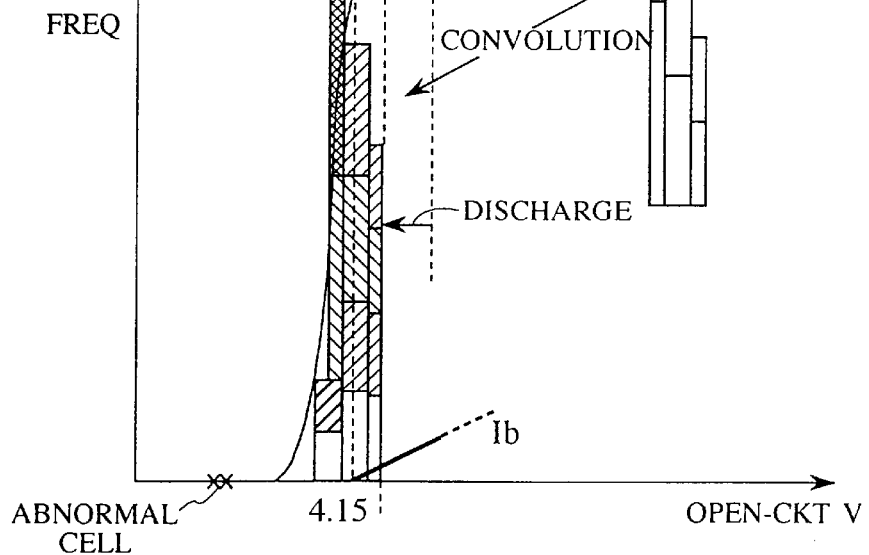

FIGS. 7A to 7C show results of another capacity regulation according to the present embodiment. FIG. 7A shows a variation in cell open-circuit voltage Vc before the capacity is regulated, FIG. 7B shows a variation in cell open-circuit voltage Vc when a first regulation of the capacity is conducted, and FIG. 7C shows a variation in cell open-circuit voltage Vc when a second regulation of the capacity is conducted. The capacity regulation is conducted while taking the temporary regulation target voltage Vv as average voltage Va, and the regulation gain γ as 200 (%).

With this capacity regulation, the cells each having a high open-circuit voltage are sequentially folded and turned down toward low open-circuit voltage side by use of convolution, and therefore, the open-circuit voltage distribution of cell is scrambled.

In the above described structure of the present embodiment, the cells C1 to Cn constitute the battery set, the battery set C constitutes a battery set, the A/D converter constitutes the detection circuit, the serial circuit comprising the resistor R and the switch S constitutes the discharge circuit, the cell controller CC and the battery controller BC constitutes the control circuit, the cell controller CC constitutes the first calculation circuit, and the battery controller BC constitutes the second calculation circuit.

The number of cells constituting the battery set, the number of cells constituting the module, and the number of cells which are controlled by the respective cell controllers are not limited in the present embodiment, of course. Further, the regulating target voltage and the abnormality judging threshold value are not limited those described in the above embodiment.

The present invention preferably described in the present embodiment can be used as a state of charge regulating apparatus of cells of a battery set for electric automotive vehicle, for example.

The present invention preferably described in the present embodiment can be applied to any kind of battery set such as lithium•ion battery, nickel•hydrogen battery, lead oxide battery. Especially, since the lithium•ion battery is excellent in correlation with respect to a relation between the charging capacity and the cell open-circuit voltage, such battery can be sufficiently precisely regulated by the present invention. Further, in the case of the lithium•ion battery, there is generally small energy loss due to a sub-reaction, a variation of the state of charge of the cells is not generated almost at all. However, with the passage of long cycle life time, it is expected that a small variation may be generated due to factors such as temperature distribution. Since there is less sub-reaction, this means that a uniform charging which utilizes the sub-reaction can not be conducted. However, according to the system as proposed by the present invention, a effective capacity of the battery set can perfectly be kept.

What is claimed is:

1. An apparatus for regulating a state of charge of each of cells of a battery set wherein the cells are serially connected to each other, comprising:
    an open-circuit voltage detection circuit detecting an open-circuit voltage of each of said cells;
    a plurality of discharge circuits respectively connected to each of said cells;
    a plurality of discharge circuits respectively connected to each of said cells so as to discharge an electric charge charged in a corresponding one of said cells; and
    a control circuit which unifies a state of charge of each of said cells, utilizing a corresponding one of said plurality of discharge circuits, based on said open-circuit voltage of each of said cells detected by said detection circuit.

2. An apparatus for regulating a state of charge of each of cells of battery set according to claim 1, wherein said control circuit controls to unify the state of charge of each of said cells when said battery set is discharged, when said battery set is charged, or when said battery set is in a cessation state.

3. An apparatus for regulating a state of charge of each of cells of battery set wherein the cells are serially connected to each other, comprising:
    a detection circuit detecting an open-circuit voltage of each of said cells;
    a plurality of discharge circuits respectively connected to each of said cells;
    a plurality of discharge circuits respectively connected to each of said cells so as to discharge an electric charge charged in a corresponding one of said cells; and
    a control circuit which unifies a state of charge of each of said cells, utilizing a corresponding one of said plurality of discharge circuits, based on said open-circuit voltage of each of said cells detected by said detection circuit; and
    wherein said control circuit obtains a frequency distribution of said open-circuit voltage of each of said cells detected by said detection circuiting, and quantifies said frequency distribution so as to conduct a statistical processing, thereby calculating a discharge capacity in order to unify said state of charge of each of said cells.

4. An apparatus for regulating a state of charge of each of cells of a battery set according to claim 3, wherein said control circuit regards said frequency distribution as a normal distribution, sets a regulation target voltage and discharges each of said cells using said discharge circuit such that a terminal voltage of each of said cells becomes equal to said regulation target voltage, and wherein said regulation target voltage is set based on an average value of said open-circuit voltages of said cells detected by said detection circuit, and based on a standard deviation of said open-circuit voltages.

5. An apparatus for regulating a state of charge of each o cells of a battery set according to claim 4, wherein said discharge circuit is a serial circuit comprising a resistor and a switch, and wherein said control circuit intermittently closes said switch of said discharge circuit to discharge of each of said cells.

6. An apparatus for regulating a state of charge of each cells of a battery set according to claim 3, wherein said control circuit comprises a first calculation circuit which obtains a predetermined statistical value by quantifying said frequency distribution so as to conduct a statistical processing, and a second calculation circuit which calculates a necessary amount of discharge for each of said cells based on said predetermined statistical value obtained by said first calculation circuit, and wherein said detection circuit, said discharge circuit and said second calculation circuit are integrally formed with said battery set and said first calculation circuit is disposed outside said battery set so as to be substantially insulated from said detection circuit, said discharge circuit and said second calculation circuit.

7. An apparatus for regulating a state of charge of each of cells of battery set wherein the cells are serially connected to each other, comprising:

a detection circuit detecting an open-circuit voltage of each of said cells;

a plurality of discharge circuits respectively connected to each of said cells;

a plurality of discharge circuits respectively connected to each of said cells so as to discharge an electric charge charged in a corresponding one of said cells; and a control circuit which unifies a state of charge of each of said cells, utilizing a corresponding one of said plurality of discharge circuits, based on said open-circuit voltage of each of said cells detected by said detection circuit; and wherein a threshold value for judging an abnormality is set based on said open-circuit voltage of each of said cells detected by said detection circuit, and wherein any of said cells having open-circuit voltage exceeding said threshold value is deleted from an object to be regulated.

* * * * *